Patented Jan. 27, 1953

2,626,940

UNITED STATES PATENT OFFICE 2,626,940

OLEFIN-CYCLODIENE-DIVINYLBENZENE TRIPOLYMER AND PREPARATION THEREOF

William J. Sparks and Robert M. Thomas, Westfield, N. J., assignors to Standard Oil Development Company, a corporation of Delaware No Drawing. Application August 23, 1951, Serial No. 243,366

9 Claims. (Cl. 260—29.1)

This invention relates to hydrocarbon polymers, and is typified by a tripolymer of a major amount of isobutylene with a minor amount of cyclopentadiene and divinylbenzene. These novel copolymers have unusual characteristics as will be explained later.

The present application is a continuation-in-part of application Serial No. 158,338, filed April 26, 1950, now Patent 2,577,822.

Copolymers have been prepared previously from an isoolefin such as isobutylene with a conjugated aliphatic diolefin such as butadiene or isoprene by a low temperature technique utilizing an active Friedel-Crafts catalyst such as aluminum chloride dissolved in a low freezing solvent such as methyl chloride. The preparation and properties of such copolymers are described, for example, in U. S. Patent 2,356,128. Such copolymers of isobutylene with aliphatic diolefins are rubber-like materials which excel natural rubber in some properties such as impermeability, but they tend to degrade somewhat too readily under the influence of heat and also, prior to vulcanization, they exhibit a rather high degree of viscous flow.

An improvement over that type of product was made by producing a new rubber-like material obtained by copolymerization of a major proportion of isobutylene with a minor proportion of a conjugated $C_5$ to $C_8$ cyclodiene, particularly cyclopentadiene having the formula

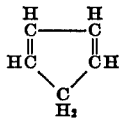

Other cyclodienes which may be used are methylcyclopentadiene, ethyl cyclopentadiene, conjugated cyclohexadiene and methyl or ethyl substituted cyclohexadiene. The resulting copolymers exhibit a surprising behavior on oxidation, in that the molecular weight of the cyclodiene copolymers increases whereas the molecular weight of copolymer of aliphatic diolefins decreases under similar circumstances. The difference in behavior can probably be explained in terms of basic polymer structure. A conventional copolymer of isobutylene and a straight-chain diolefin such as butadiene necessarily has a plurality of residual double bonds in the principal carbon chain, probably as follows:

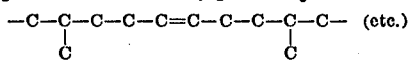

This structure makes the polymer susceptible to scission at the double bond so as to leave two independent fragments, each having a substantially lower molecular weight than the original polymer. In contrast, the isobutylene-cyclodiene copolymers have the residual double bonds outside of the principal carbon chain:

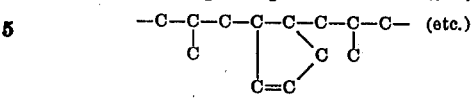

Thus, even when the double bond is split open as in case of oxidation, a side chain is formed thereby, but neither the length of the principal chain nor the total molecular weight are affected. Indeed, some of the broken double bonds apparently unite with similar units of other polymer molecules, with the result that the over-all molecular weight is increased.

In making such isobutylene-cyclopentadiene copolymers, the general procedure used is substantially as described in U. S. Patent 2,356,128, except using a conjugated cyclodiene instead of an aliphatic diolefinic monomer. Usually about 0.5 to 50, preferably 1 to 10 parts by weight of cyclopentadiene are mixed with 100 parts by weight of isobutylene, and the resulting mixture is cooled to a polymerization temperature between —20° C. and —164° C., preferably —70° C. to —110° C. It is also desirable to dilute the reactants with a low-freezing, non-polymerizable diluent such as the various mono- or polyhalogenated alkanes, or a $C_2$ to $C_5$ aliphatic hydrocarbon or carbon disulfide or the like, it being merely necessary for the diluent that it be liquid at the polymerization temperature and non-reactive in the presence of the polymerization catalyst. Usually about 50 to 500 parts of diluent are added per 100 parts of isobutylene. Suitable diluents include ethylene, ethane, propane, butanes, pentanes, methyl chloride, ethyl chloride and ethylene chloride as well as the similar low-freezing fluoro-alkanes or fluoro-chloroalkanes.

Now, according to the present invention, a further improvement is obtained by adding to the ingredients mentioned above, as the polymerizable feed, about 0.1 to 5.0 parts (per cent by weight), preferably 0.2 to 3 parts of divinyl benzene or its homologues. This is highly effective in raising the molecular weight of the polymeric product, but unlike in the copolymerization of isobutylene with aliphatic diolefins, such addition of divinylbenzene to cyclodiene feeds does not normally produce any gelation difficulties during the polymerization.

The cold material is then polymerized by the application thereto of a liquid phase Friedel-Crafts catalyst such as aluminum chloride dissolved in a low-freezing, non-complex forming solvent such as methyl or ethyl chloride or carbon disulfide; or with such metal halides as aluminum bromide or chloro-bromide, the light hydrocarbons such as the butanes are particularly useful catalyst solvents. The concentration of the catalyst solution may be between about 0.05 to 10%, usually between 0.1 and 2% by weight. Normally about 0.1 to 3.0 grams of Friedel-Crafts halide is required to produce 100 grams of polymer.

The polymerization occurs promptly on addition of catalyst and can be conducted either in a succession of batch reactions or in a continuous reaction. In either case, the polymer is preferably recovered by discharging the polymerized material, usually at conversions ranging from 60 to 85% based on monomers, into a flash tank containing warm water which kills the catalyst, volatilizes out the unpolymerized monomers and the diluent if used, and converts the polymer from a slurry in cold reaction mixture into a slurry in warm water. Various slurry stabilizers and polymer stabilizers may be added to the flash tank. The polymer is then recovered by a straining operation followed by drying and hot milling.

As so prepared, the polymer has a Staudinger molecular weight between 20,000 and about 100,000, preferably about 40,000 to 80,000 and a wijs iodine number between about 1 and 50. The polymer should contain between about 0.5 and 30%, preferably 1 to 10% of combined cyclodiene as determined by ozonolysis at 0° C., and about 0.1 to 5.0%, preferably 0.2 to 3.0% of combined divinyl aromatic compound.

The polymer can be vulcanized with sulfur, especially in the presence of conventional vulcanization accelerators. Suitable accelerators include low molecular weight alkyl thiuram disulfides such as tetramethylthiuram disulfide, mercaptobenzothiazole, benzothiazyl disulfide, N-cyclohexyl-2-benzothiazole sulfenamide and the like. Other types of accelerators used for curing isobutylene-isoprene copolymers of low iodine No. (e. g. 1–10), of the GR–I type, are also suitable. Carbon black, zinc oxide or other pigments or fillers, or plasticizers of the hydrocarbon type or of the ester type, and other conventional compounding ingredients may also be present. Another advantage of this invention is that it permits the use of more plasticizer than can be used with either the isobutylene-cyclodiene copolymers or the commercial isobutylene-isoprene copolymers. For example, with the present copolymers, about 5–40, preferably about 10–30 parts by weight of plasticizer can be used per 100 of copolymer rubber. Suitable materials include the non-volatile mineral oils, or various esters, such as dibutyl phthalate, dioctyl phthalate, dioctyl sebacate, etc.

For compounding and curing these copolymers, the following typical recipe may be used:

| | |
|---|---|
| Isobutylene – cyclopentadiene – divinylbenzene copolymer. | 100 parts. |
| Zinc oxide | 0 to 10 parts, preferably 3 to 8 parts. |
| Sulfur and accelerator | 0.5 to 10 parts. |
| | Sulfur, 0.1 to 3 parts. |
| | Accelerator(s), 0.5 to 3 parts. |
| Carbon black | 0 to 100 parts. |

Vulcanization is obtained by heating the compound in a known manner, e. g. for 5 to 60, preferably 10 to 40 minutes at about 175 to 130° C.

Alternatively, it is possible to omit the sulfur and accelerator and to vulcanize the polymer with the aid of p-quinone dioxime or the like as described in U. S. 2,393,321; or vulcanization can be effected with the aid of a dinitroso-compound such as para- or meta-dinitrosobenzene.

When vulcanized, the polymer is rubber-like, elastic and in general resembles ordinary isobutylene-isoprene type (e. g. GR–I) rubber. However, unlike ordinary GR–I, the isobutylene cyclodiene-divinylbenzene copolymers of the invention stiffen upon oxidation, which phenomenon can be used as a means for reducing the viscous flow of unvulcanized polymer. Moreover, the peculiar character of these novel copolymers makes them especially well suited for use under oxidative conditions, e. g. as tire curing bags.

The invention is illustrated by the following examples wherein every reference to "parts" will be understood to mean "parts by weight" unless expressly stated otherwise.

*Example 1*

A liquid feed was prepared by mixing 1000 grams methyl chloride, 270 grams (90%) of isobutylene and 30 grams (10%) of cyclopentadiene (freshly distilled from dimer). The resulting feed, which possessed a characteristic opalescence not apparent in the case of aliphatic feeds, was externally cooled to about −100° C. 220 grams of a catalyst solution containing 0.24 weight percent of aluminum chloride in methyl chloride were gradually added to the cold feed with stirring, over a period of 15 minutes. In this time, as the catalyst concentration was increasing, a vigorous polymerization reaction took place and was finally quenched by the addition of isopropyl alcohol 5 minutes after the last portion of the catalyst solution had been added. The reaction mixture was then dumped into warm isopropyl alcohol, the resulting polymer washed with boiling water on a kneader, and milled at 150° C. for 15 minutes in the presence of 0.5 grams of phenylbeta-naphthylamine and 2 grams of zinc stearate, in order to remove all low boiling components therefrom.

In this manner 290 grams of dry polymer having an 8-minute Mooney viscosity of 34 were recovered. The polymer was then compounded according to the following recipe:

Polymer 100 parts, zinc oxide 5 parts, stearic acid 3 parts; tetramethylthiuram disulfide 1 part, mercaptobenzothiazole 0.5 part, sulfur 1.5 parts, EPC Black 50 parts.

When cured at 153° C. for the times indicated below, vulcanizates having the following physical properties were obtained:

| Cure | 40 Min. | 60 Min. | 90 Min. |
|---|---|---|---|
| Tensile, lbs./sq. in | 690 | 875 | 1,000 |
| Elongation, percent | 475 | 420 | 400 |
| Modulus at 300% elongation | 725 | 850 | 1,000 |

Following substantially the same procedure as described above, a polymer was prepared from the following feed:

| | Parts | Percent Weight |
|---|---|---|
| Methyl chloride | 1,000 | |
| Isobutylene | 285 | 94 |
| Cyclopentadiene | 15 | 5 |
| Divinylbenzene (80% pure) | 3 | 1 |
| Total reactants | 303 | 100 |

When dumped into the hot quenching bath, an unusually fluffy and voluminous product was obtained, indicating that polymer constituted a highly effective barrier through which the methyl chloride and other low boiling constituents had great difficulty escaping.

In this run 285 grams of dry polymer having an 8-minute Mooney viscosity of 77 were obtained. When compounded and cured in the same manner described above, vulcanizates having the following properties were obtained:

| Cure | 40 Min. | 60 Min. | 90 Min. |
|---|---|---|---|
| Tensile, lbs./sq. in | 940 | 1,125 | 1,250 |
| Elongation, percent | 375 | 335 | 325 |
| Modulus at 300% elongation | 850 | 1,075 | 1,175 |

It is significant to observe that due to the modification with divinylbenzene, the polymer of this run had a substantially higher Mooney viscosity and molecular weight, as well as better physical properties than the simple isobutylene-cyclopentadiene polymer of the previous run. The tensile properties are particularly good considering the high degree of monomer conversion, 94%.

Example 2

Another run illustrating the beneficial modification of isobutylene-cyclodiene polymers by copolymerization with divinylbenzene was made with the following feed:

|  | Parts | Percent Weight |
|---|---|---|
| Methyl chloride | 1,000 |  |
| Isobutylene | 285 | 93 |
| Cyclopentadiene | 15 | 5 |
| Divinylbenzene (80% pure) | 6 | 2 |
|  | 306 | 100 |

When polymerized by the procedure described in Example 1, 280 grams of dry polymer having an 8-minute Mooney viscosity of 82 were obtained. It is important to remark that neither in Example 1 nor in Example 2 was any gelation of the reaction mixture encountered. In contrast, it is well known that in the case of copolymers of isobutylene with aliphatic diolefins the reaction mixture tends to gel when as little as about 1 or 2% of divinylbenzene (based on other monomers) is present in the feed. This indicates that the reaction mechanism of isobutylene-cyclodiene-divinylbenzene feeds is quite different from similar feeds wherein the cyclodiene is replaced by an aliphatic diolefin. Thus, it is possible to modify cyclodiene copolymers much more extensively with divinylbenzene e. g. up to about 5 percent than similar aliphatic diene copolymers.

When the product of Example 2 was compounded and cured in the manner described in Example 1, vulcanizates having the following properties were obtained:

| Cure | 20 Min. | 40 Min. | 60 Min. | 90 Min. |
|---|---|---|---|---|
| Tensile, lbs./sq. in | 760 | 1,140 | 1,225 | 1,350 |
| Elongation, Percent | 320 | 320 | 320 | 285 |
| Modulus at 300 percent elongation | 725 | 1,100 | 1,170 |  |

A comparison of the above data with those of the preceding example illustrates the beneficial effect of increasing divinylbenzene content, namely giving a faster cure and a slightly stronger cure. With a 40 min. cure, the tensile was 1140 compared to 940, and the modulus was 1100 compared to 850.

In carrying out the present invention, cyclodienes other than cyclopentadiene may be used, such as conjugated cyclohexadiene or else methyl cyclopentadiene.

Some other examples of proportions (expressed in percent by weight) of materials which may be used in making the tripolymers of this invention are shown here below:

| Ex. No | 3 | 4 | 5 | 6 | 7 | 8 |
|---|---|---|---|---|---|---|
| Cyclopentadiene | 1 | 1 | 2 | 3 | 4 | 10 |
| DVB | 0.2 | 1 | 0.5 | 1 | 2 | 3 |
| Isobutylene | 98.8 | 98 | 97.5 | 96 | 94 | 87 |

In general, it is desirable to maintain a ratio of the proportion of cyclopentadiene to the divinylbenzene in respect to each other so that the percent of cyclopentadiene will be about ½ to 10 times the percent of divinylbenzene, and preferably about 2 to 5 times the percent of divinylbenzene.

The tripolymers of this invention possess a peculiar resistance to oxidative break-down in molecular weight. In this respect they are superior to simple two-component copolymers of either isobutylene with a small amount of divinylbenzene or the commercial synthetic rubber of the GR–I type (e. g. isobutylene with a minor amount of isoprene).

The foregoing specification describes the invention which relates to a new type of rubber-like material, namely to tripolymers of isobutylene, cyclodiene and divinylbenzene and their homologues. But it will be understood, of course, that in addition to the specific illustrative examples listed above, numerous other embodiments are possible without departing from the scope of the invention disclosed and claimed herein.

What is claimed is:

1. A synthetic high molecular weight tripolymer of a major proportion of a mono-olefin of 4 to 6 carbon atoms, and a minor proportion of a cyclodiene and 0.1 to 5% of divinyl benzene.

2. A synthetic high molecular weight tripolymer of about 70 to 90% by weight of an iso-olefin of 4 to 5 carbon atoms, about 0.5 to 30% of cyclodiene having a total of 5 to 8 carbon atoms and having 2 conjugated double bonds in a ring structure consisting of 5 to 6 carbon atoms, and 0.1 to 5.0% of divinylbenzene.

3. A synthetic high molecular weight tripolymer of about 90 to 98% by weight of isobutylene, about 1 to 10% of cyclopentadiene, and 0.2 to 3% of divinylbenzene.

4. A synthetic high molecular weight tripolymer of about 93 to 97% by weight of isobutylene, about 2.5% of cyclopentadiene and 0.5 to 2% of divinylbenzene.

5. The process of preparing a high molecular weight tripolymer which comprise copolymerizing about 70 to 99% by weight of a mono-olefin of 4 to 6 carbon atoms, 0.5 to 30% of a cyclodiene, and 0.1 to 5.0% of divinylbenzene, at a temperature of about −20° C. to −164° C., in the presence of a Friedel-Crafts catalyst.

6. The process of preparing a synthetic solid plastic high molecular weight tripolymer which consists essentially in copolymerizing about 90 to 98% by weight of isobutylene, 1 to 10% of cyclopentadiene, and 0.2 to 3.0% of divinylbenzene, in the presence of about 50 to 500 volumes of diluent per 100 volumes of mixed reactants, at a temperature between about $-70°$ C. and about $-110°$ C., in the presence of a dissolved Friedel-Crafts catalyst.

7. Process according to claim 6 in which the percent of cyclopentadiene is 2 to 5 times the percent of divinylbenzene.

8. Composition comprising essentially a high molecular weight tripolymer as defined in claim 1, having homogeneously admixed therewith about 5 to 40 parts by weight of plasticizer per 100 parts of tripolymer, said composition being vulcanized to a tough elastic synthetic rubber.

9. A process of preparing a solid plastic hydrocarbon copolymer which comprises mixing 100 parts of isobutylene, 1 to 10 parts of cyclopentadiene and 0.2 to 3 parts of divinylbenzene, cooling the mixture to a temperature between $-70°$ C. and $-110°$ C., and adding thereto a solution of an active Friedel-Crafts catalyst.

WILLIAM J. SPARKS.
ROBERT M. THOMAS.

No references cited.